(12) United States Patent
Doering et al.

(10) Patent No.: US 12,320,744 B2
(45) Date of Patent: Jun. 3, 2025

(54) REFERENCE SAMPLE FOR A MICROSCOPE, METHODS AND USES

(71) Applicant: CARL ZEISS MICROSCOPY GMBH, Jena (DE)

(72) Inventors: Volker Doering, Jena (DE); Andreas Seher, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 523 days.

(21) Appl. No.: 17/797,308

(22) PCT Filed: Feb. 11, 2021

(86) PCT No.: PCT/EP2021/053342
§ 371 (c)(1),
(2) Date: Aug. 3, 2022

(87) PCT Pub. No.: WO2021/160744
PCT Pub. Date: Aug. 19, 2021

(65) Prior Publication Data
US 2023/0057044 A1   Feb. 23, 2023

(30) Foreign Application Priority Data
Feb. 13, 2020 (DE) .................... 10 2020 201 806.5

(51) Int. Cl.
*G01N 21/00* (2006.01)
*G01N 21/27* (2006.01)
*G01N 21/64* (2006.01)
(52) U.S. Cl.
CPC ....... *G01N 21/278* (2013.01); *G01N 21/6458* (2013.01)

(58) Field of Classification Search
CPC ... G01N 21/278; G01N 21/6458; G02B 21/34
USPC .................................................. 250/440.11
See application file for complete search history.

(56) References Cited

U.S. PATENT DOCUMENTS

| 2018/0292311 A1* | 10/2018 | Boamfa ............. G01N 21/278 |
| 2019/0033166 A1 | 1/2019 | Pickford |

FOREIGN PATENT DOCUMENTS

| DE | 102005049364 A1 | 9/2006 |
| DE | 102014205660 A1 | 10/2015 |
| DE | 102019120960 A1 | 2/2021 |
| WO | 2006007766 A1 | 1/2006 |

(Continued)

OTHER PUBLICATIONS

International Search Report for International Application No. PCT/EP2021/053342 dated May 17, 2021.

(Continued)

*Primary Examiner* — Michael Maskell
(74) *Attorney, Agent, or Firm* — DUANE MORRIS LLP

(57) ABSTRACT

A reference sample for calibrating and/or adjusting a microscope and to uses of the reference sample. The latter has at least one carrier structure made of a carrier material which, at least in regions of its extent, is excitable to emit luminescence light, and at least one two-dimensional and/or three-dimensional structure consisting of a number of substructures. The carrier material is diamond or silicon carbide and is doped in or around the regions of the two-dimensional and/or three-dimensional structure in order to be excitable to emit the luminescence light.

13 Claims, 13 Drawing Sheets

(56) References Cited

FOREIGN PATENT DOCUMENTS

WO      2016030401 A1    3/2016
WO      2017109057 A1    6/2017

OTHER PUBLICATIONS

Royon, Arnaud, et al.; "Quality Control of Fluorescence Imaging Systems: a new tool for performance assessment and monitoring"; Optik & Photonik 2017; 12(2):22-25.

Ou, Yiyu, et al.; "Donor-acceptor-pair emission characterization in N—B doped fluorescent SiC"; Optical Materials Express 2011; 1(8):1439-1446.

Ou, Yiyu, et al.; "Characterization of donor-acceptor-pair emission in fluorescent 6H—SiC"; Physica Scripta IOP Publishing 2012; T148:1-3.

Weil, T.; "Nanodiamanten mit Gitterdefekten als innovative Materialien fur biomedizinische Anwendungen"; Forschungsbericht 2017-Max-Planck-Institut fur Polymerforschung; pp. 1-3.

* cited by examiner

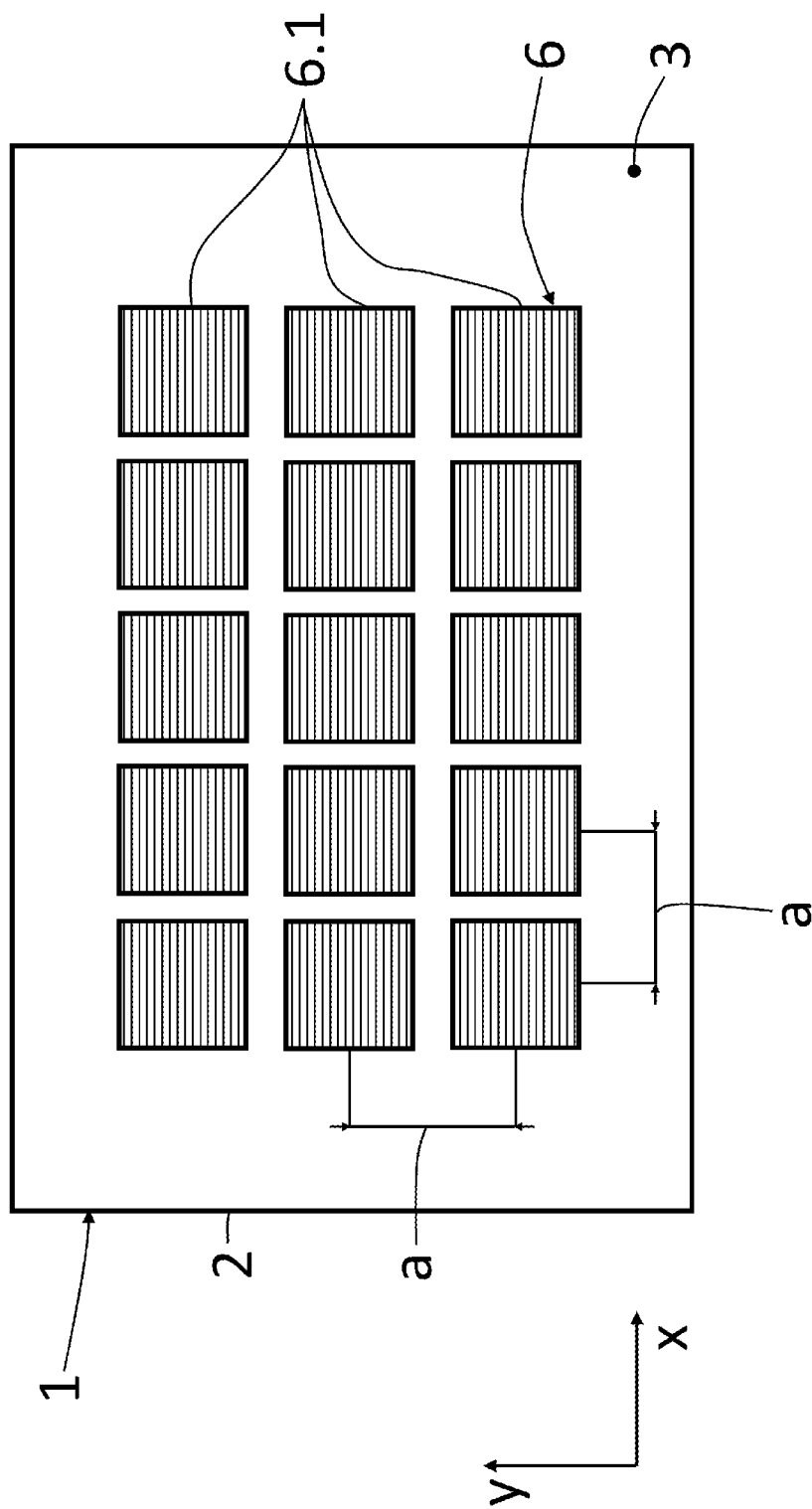

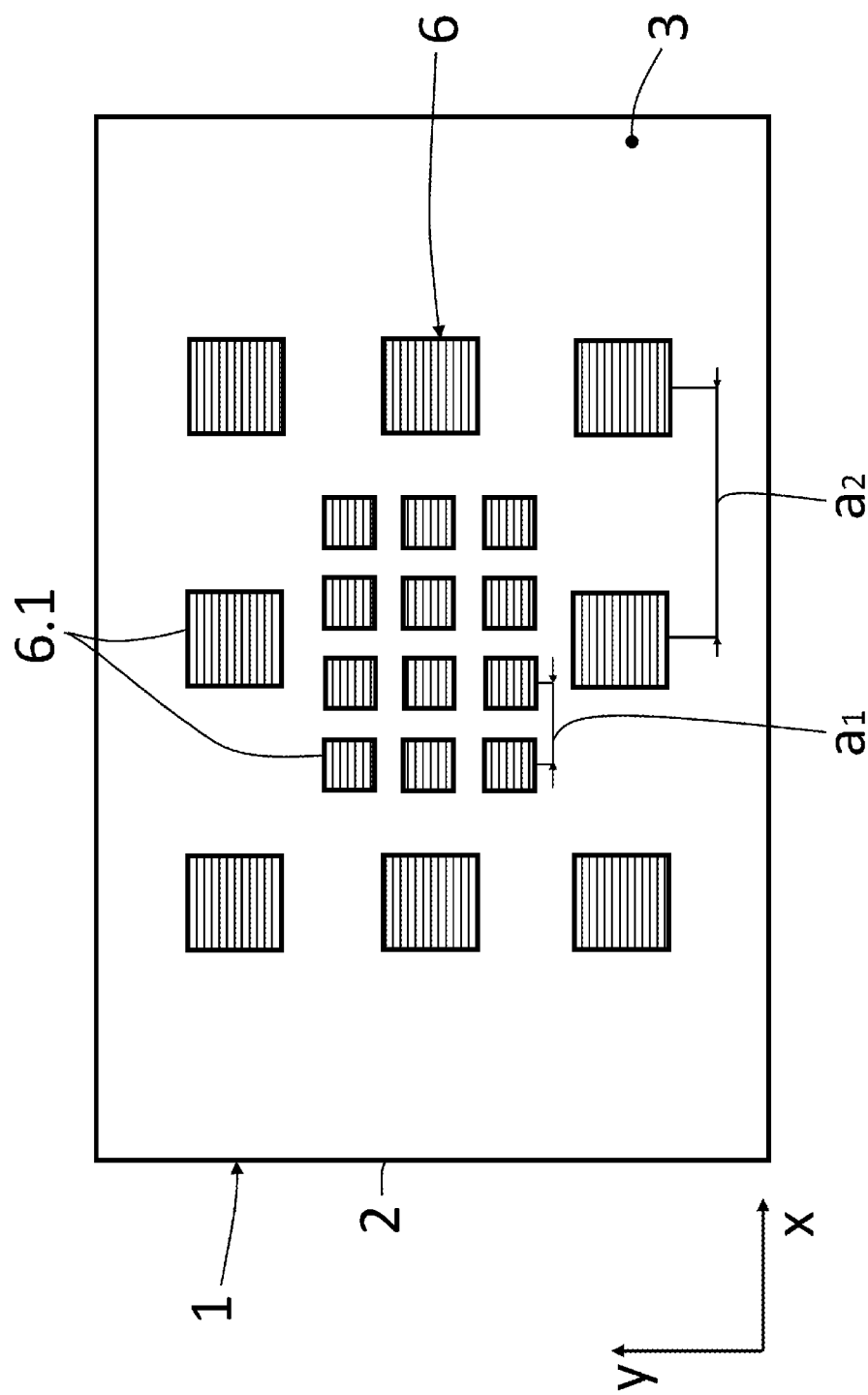

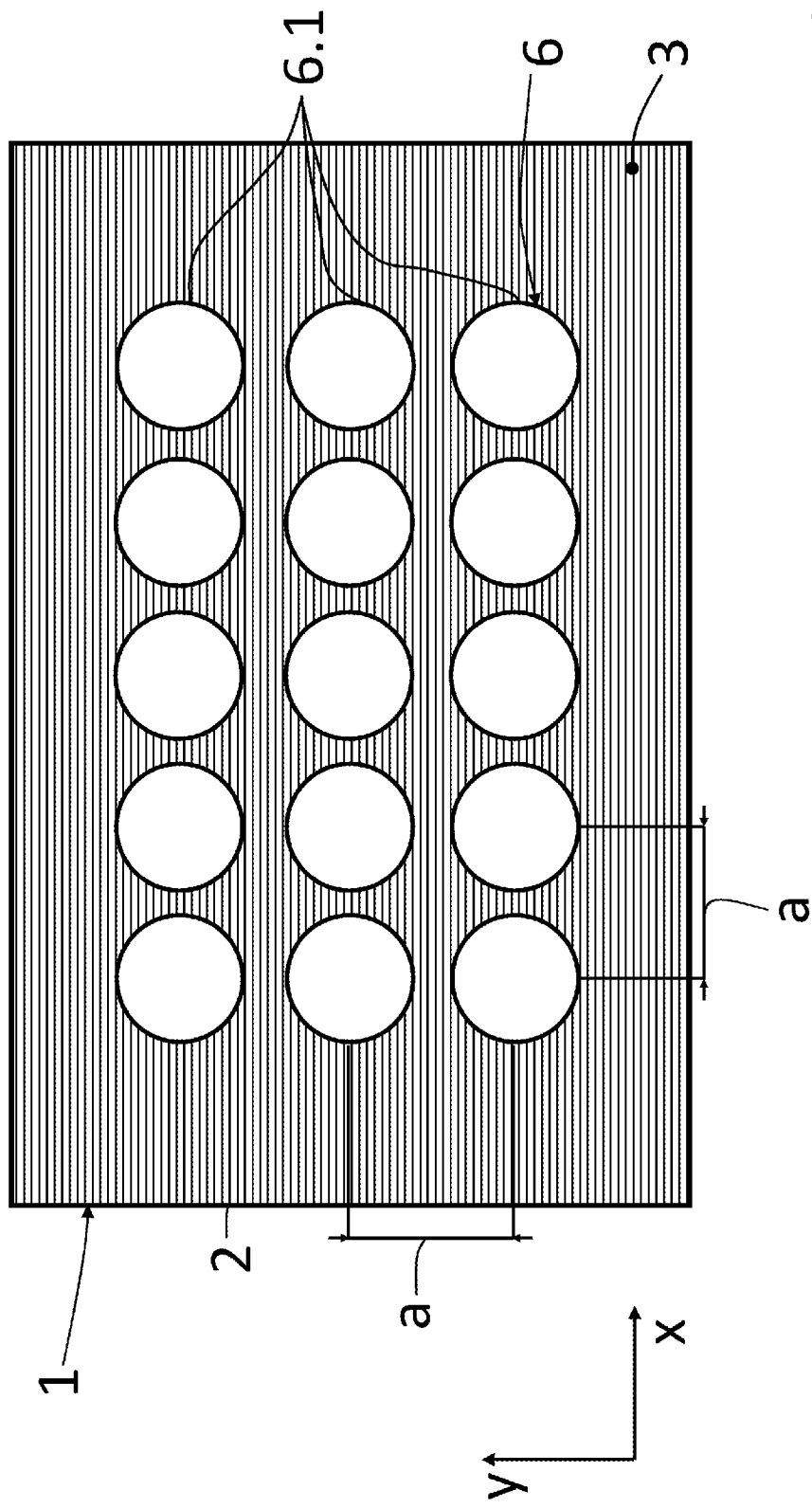

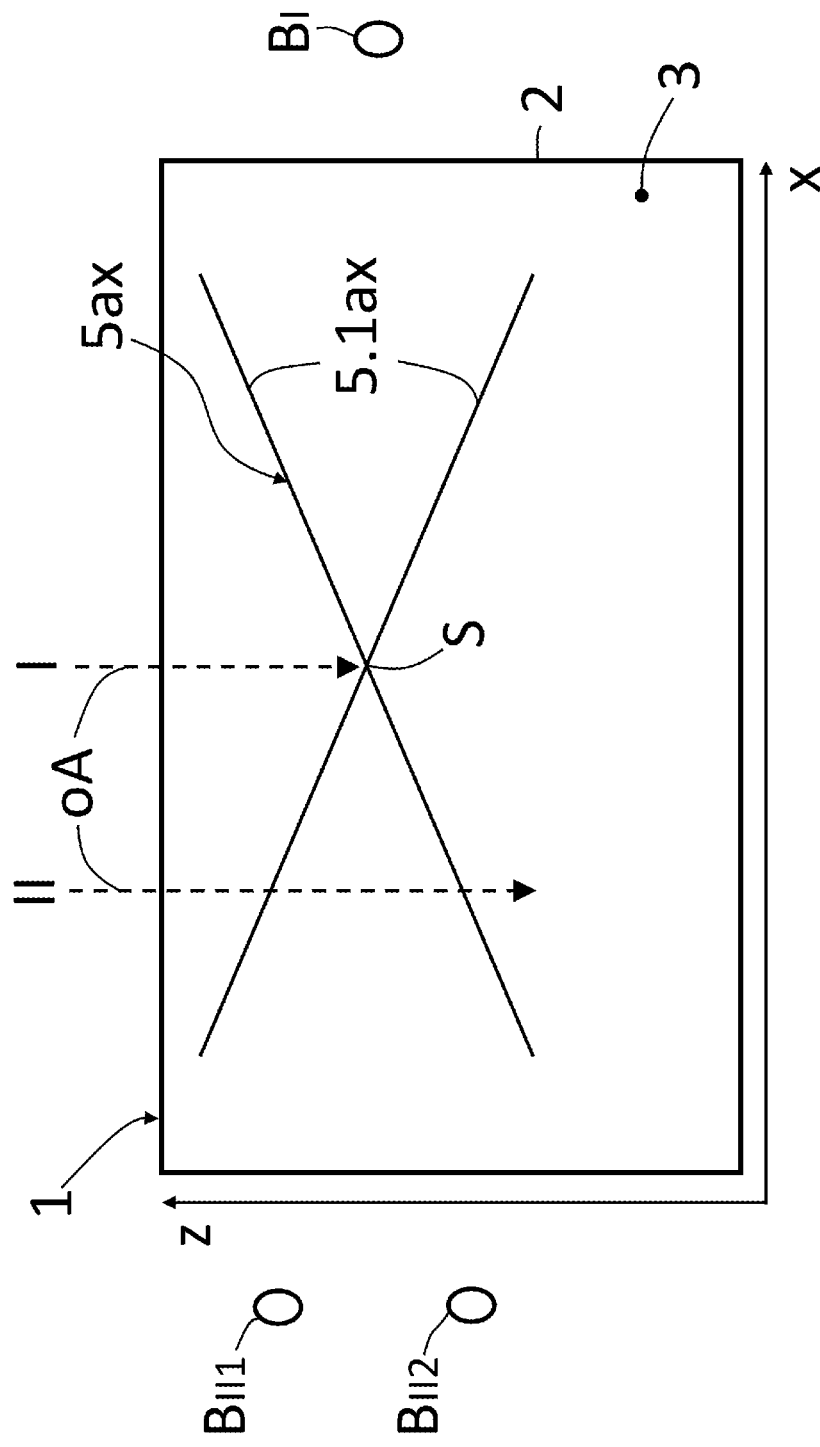

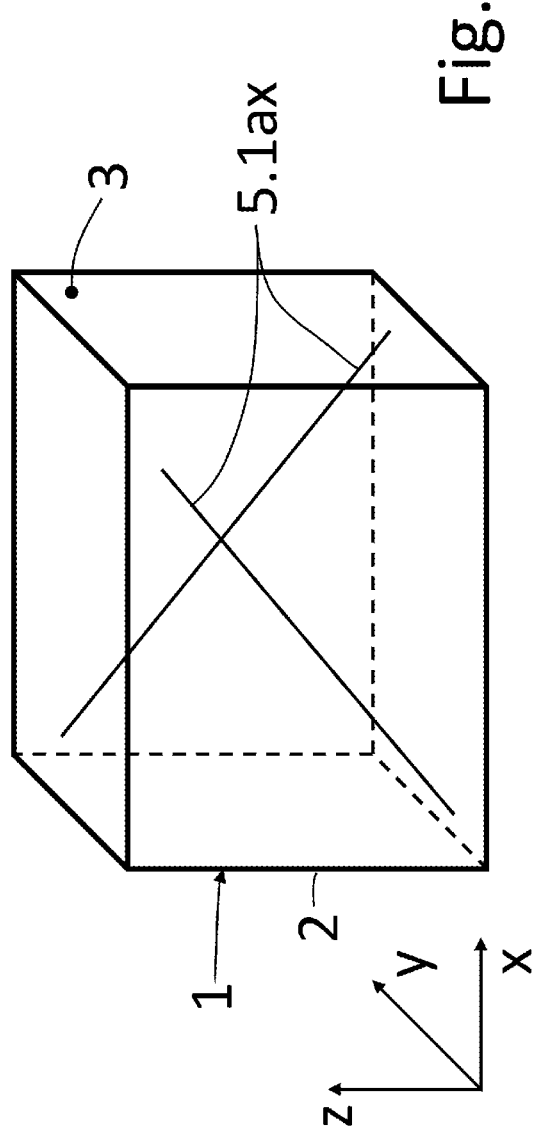
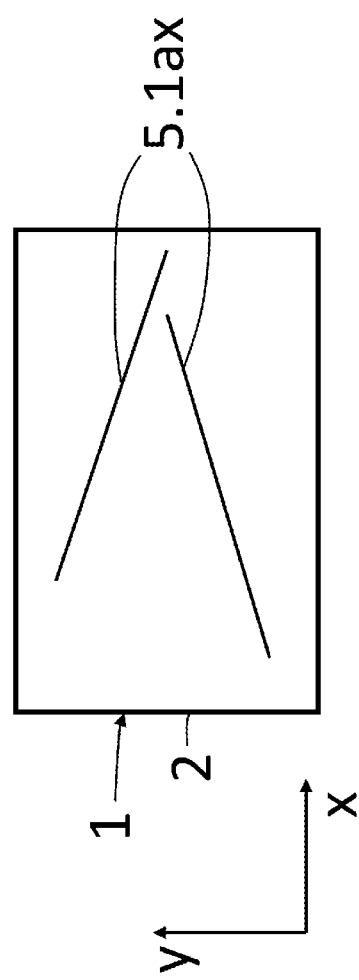

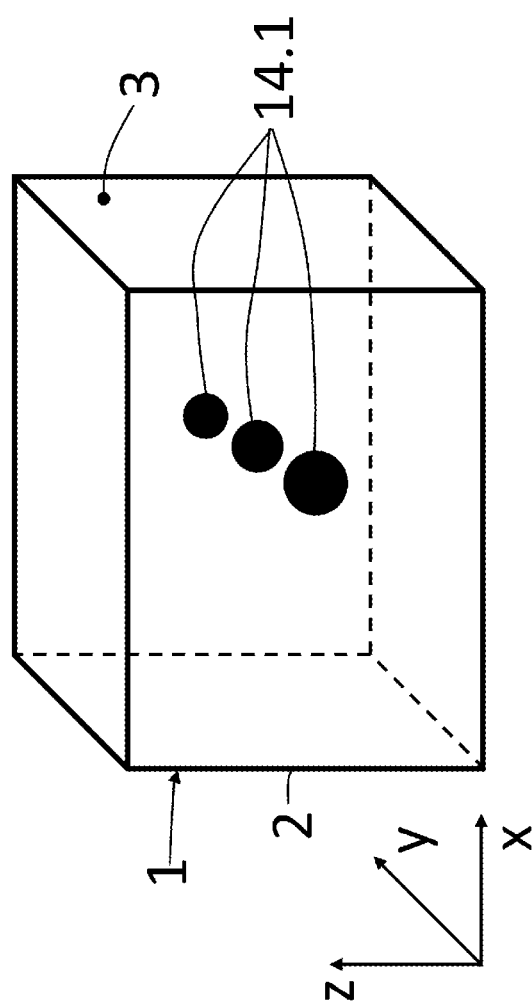
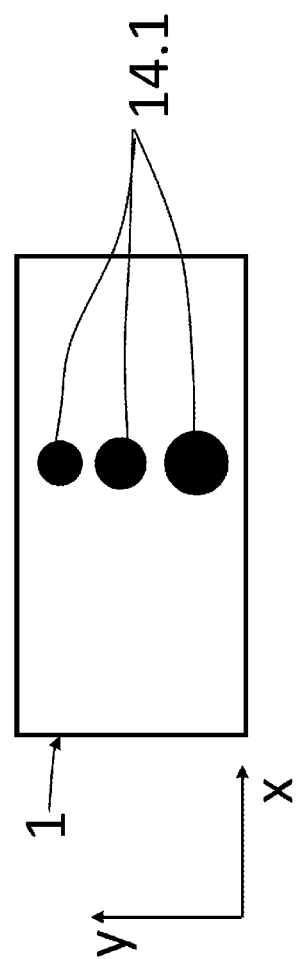

REFERENCE SAMPLE FOR A MICROSCOPE, METHODS AND USES

RELATED APPLICATIONS

The present application is a U.S. National Stage application of International PCT Application No. PCT/EP2021/053342 filed on Feb. 11, 2021, which claims priority benefit of German Application No. DE 10 2020 201 806.5 filed on Feb. 13, 2020, the contents of each are incorporated by reference in their entirety.

FIELD OF THE INVENTION

The invention relates to a reference sample according to the preamble of independent claim 1 and to uses of the reference sample.

BACKGROUND OF THE INVENTION

Optical imaging systems, in particular high-resolution microscopes, can be calibrated and/or adjusted using reference samples. Such reference samples are provided with two-dimensional structures in the form of test patterns that were created in a carrier material of the reference sample or are applied to the carrier material. These test patterns have substructures whose localization on the reference sample, whose dimensions and distances from one another, in particular their lateral distances, are known in advance.

For example, reference samples in the form of an object slide or a cuvette, which is customary in the field of light microscopy, are known. These consist of glass and have two-dimensional test patterns (structures) that are excitable to emit fluorescence radiation. For example, the resolution of the used configuration of a microscope can be assessed on the basis of the captured fluorescence radiation of the test patterns.

The excitation and emission of the fluorescence radiation are based on doping the glass, in particular with what are known as rare earths. Fluorescence centers generated in this way are by far not degenerated as quickly by excitation radiation and environmental conditions as fluorescence markers based on proteins or inorganic marker molecules, but even the doped glasses show a sometimes significant decrease in the emitted intensities with multiple excitation (e.g., Royon, A. and Converset, N., 2017: Quality Control of Fluorescence Imaging Systems—A new tool for performance assessment and monitoring; Optik & Photonik 2/2017: 22-25).

The structures used as test patterns have hitherto been introduced into the carrier material using technical methods whose resolution corresponds to the resolution of the optical systems to be measured, calibrated or adjusted, in particular microscopes. A metrological determination of the resolution of high-resolution microscopes with the reference samples known from the prior art is therefore possible only to a very limited extent.

OBJECT OF THE INVENTION

The invention is therefore based on the object of proposing a reference sample which enables improved resolution measurement compared to the prior art. In addition, the invention is intended to create a possibility for enabling comparative measurements on optical systems and imaging systems, in particular microscopes, which are not influenced by degeneration of the intensity of the luminescence from the sample.

The object is achieved by the subject matter of the independent claims. Advantageous configurations of the invention are found in the dependent claims.

The reference sample is used to measure, calibrate and/or adjust an optical imaging system such as a microscope, in particular a high-resolution microscope, and has at least one carrier structure made of a carrier material which, at least in regions of its extent, i.e., at least in regions or sections, is excitable to emit light (luminescence). The carrier material also has at least one two-dimensional and/or three-dimensional structure that is predetermined with regard to its dimensions and shape and consists of a number of substructures. This two-dimensional and/or three-dimensional structure forms the test pattern. The reference sample can have several structures, which can also differ from one another with regard to their dimensions and shape. The structures are also referred to below as test patterns.

According to the invention, the carrier material consists of diamond, which in particular can be produced technically. A further embodiment according to the invention uses silicon carbide (SiC) as carrier material. In order that the carrier material is excitable to emit light, the carrier material is doped in or around the regions of the structure.

The carrier structure allows the test pattern to be provided and used repeatedly and contains or carries the structure. The carrier structure can be placed, for example, on an object slide that is customary in microscopy.

The respective substructure is formed laterally and/or axially as an area, as points, as a three-dimensional structure and/or as a combination of at least two line sections. In this case, a lateral substructure extends on or under a surface of the reference sample and substantially parallel thereto, while an axial substructure extends into the carrier material in a z-direction or at an angle thereto.

An optical imaging system, for example a microscope, is referred to as high-resolution if it can be used to display structures that are smaller than the Abbe limit. The invention will be explained below by way of example using one or more microscopes.

An excitation to emit luminescence takes place in particular by means of an excitation radiation having a suitable wavelength and intensity.

In an advantageous embodiment of the reference sample, the carrier material is doped with nitrogen-vacancy pairs. For example, a carrier material also known as NV diamond (nitrogen-vacancy diamond) is excitable with laser radiation having wavelengths in the visible range and likewise emits in the visible wavelength range (see, e.g., Weil, T. 2017: Lattice defect nanodiamonds as innovative materials for biomedical applications (Nanodiamanten mit Gitterdefekten als innovative Materialien für biomedizinische Anwendungen); Research Report 2017—Max Planck Institute for Polymer Research).

In further embodiments of the reference sample according to the invention, the carrier material is doped at least in regions with silicon-vacancy pairs (SiV centers), phosphorus-vacancy, oxygen-vacancy, sulfur-vacancy, tin-vacancy and/or manganese-vacancy pairs.

The reference sample can have one or more structures. These are each formed from at least one substructure, which can be designed differently in order to make possible different measurements or to be usable for different optical systems, in particular different microscopes or cameras.

The structures are introduced into the carrier material of the carrier structure for example by means of a lithographic method. The production of such structures is described, for example, in Michl et al. (Michl, J. et al.: A Diamond Nanoscale Reference for Super-Resolution Microscopy, unpubl., submitted to a journal for publication).

The lateral substructures of a structure can be pairs of line sections (line pairs) arranged next to one another with a respective distance between the line sections. Such an embodiment of the structure makes it possible, depending on the selected distance between the line sections, to determine whether the line sections of the respective substructures can be resolved optically. Depending on the extent of the structure, it can additionally be checked whether there is resolution only over regions or over the entire field of view. For example, it is possible by means of an appropriately dimensioned structure, that is to say a structure comprising a correspondingly large number of substructures, to check whether the resolution is present for example in a central region of the field of view as well as in a more peripheral region. The extent of the region of error-free imaging, for example without distortions and/or without losses in the achievable resolution, can be used to determine the image field size that can be used in each case.

In order to effectively find the resolution limit, it is advantageous if there are a plurality of structures on a reference sample, whose substructures or line sections are located at different distances from one another. For example, at least one structure can be present, within which the distance between the line sections of the substructures changes step by step from pair to pair. For example, the distances between the line sections can be selected from a range of 25 nm to 500 nm and can be, for example, 25, 50, 75, 100, 125, 150, 200, 250, 300, 400 and/or 500 nm.

Using modern microstructuring techniques, lateral resolutions and positioning accuracies of 5 nm can be achieved. In this case, for example, the variance of the distances between the line sections of the respective pairs is less than 2% or less than 2 nm, depending on which value is greater. The width of lines of the substructures is advantageously no greater than 50 nm, preferably no greater than 20 nm, and their length is 10 µm, for example. The individual pairs of line sections are spaced apart from one another with a constant pitch of, for example, 10 µm.

This embodiment is of great advantage for the comparison of the measurement means or optical systems and the determination of the resolution, since the structure size has a significant influence on the perceived or determined resolution if it is the same size or slightly smaller than the size to be determined. Deviations from the desired structure shape/size are also subject to this restriction.

The substructures, in particular when they are embodied as pairs of line sections, can be arranged parallel to one another. They can be perpendicular to a (virtual) reference line or inclined at a specific angle, for example 30°, 45° or 90°. In further embodiments, the substructures can also be arranged next to one another in lines or rows.

In a further possible embodiment, the substructures are formed, for example, as line sections which are arranged parallel to one another and in one direction with increasing distances between them. A further embodiment is, for example, a two-dimensional grid, whose grid lines are parallel to one another and arranged with increasing distances between them in at least one direction.

With reference samples designed in this way, it is possible, in addition or as an alternative to determining the image field size, to analyze for example the respective optical transfer function (OTF), the modulation transfer function (MTF), and the point spread function (PSF). Here, the MTF describes the contrast of all spatial frequencies of a system, for example the number of line sections per unit of length (e.g., per millimeter). The PSF specifies the mapping function of an image point. If the PSF is subjected to a Fourier transform, the OTF is obtained. The latter also contains, in addition to the MTF, information relating to what is known as the PTF (phase transfer function) in the sense of the connection OTF=MTF*e^(i*PTF). Alternatively, the connection can also be presented as $\mathcal{F}\{S(z)\}= \mathcal{M}(k_z)e^{i\Phi(k_z)}$ with $\mathcal{F}\{S(z)\}$ as an optical transfer function, $\mathcal{M}(k_z)$ as a modulation transfer function, and $e^{i\Phi(k_z)}$ as a phase transfer function see, e.g., Hecht, E. (1987): Optics; 508 ff; ISBN: 0-201-11611-1).

In practical terms, this means that the MTF can be measured directly with the aid of a substructure in the form of line sections. The OTF largely depends on the PSF of the system. The PSF can be determined using different substructures. For example, small point-shaped substructures can be used for this purpose, which amount to, for example, about one tenth to one fifth of the minimum resolvable structure size of an optical system.

Such measurements are not only relevant for high-resolution optical systems, but can likewise be used for optical systems of different resolutions. The advantage here is the possible comparability and very good calibratability of the systems, which is based in particular on the robustness of the reference sample against undesired bleaching.

It is advantageous that not only a part of the images is assessed, but that the optical system as a whole can be measured in a recording state or in a configuration state for the actual use for recording fluorescence images. In contrast to the prior art, with the reference sample according to the invention, there is no need for separate recordings of the illumination and detection beam paths, and direct and easily retraceable proof of the resolution of a system can be provided.

In further embodiments of the invention, the lateral substructures of a respective structure can be formed as areas that are excitable to emit luminescence. For example, such areas can be arranged in a grid. The individual areas of the grid advantageously have predetermined sizes, shapes and distances from one another. For example, such a grid can be used to detect any occurring distortions which present, for example, in curved outlines of the grid, even though the grid on the reference sample has straight outlines and right angles. For example, the grids have dimensions of 250×250 µm, 1×1 mm or 6×6 mm. The pitches between the areas are, for example, 2 µm, 10 µm or 25 µm. If the areas are in the form of circular areas ("points"), they have a diameter of 100 nm, 250 nm or 500 nm, for example. If the areas are formed as rectangles, their edge lengths are 100 nm, 250 nm or 500 nm, for example. Other possible embodiments are, for example, crosses, lines or similar shapes. The thickness of the substructures in the z-direction is advantageously less than or equal to 50 nm, preferably less than or equal to 25 nm.

In further embodiments, the reference sample according to the invention can have a machine-readable code as a structure. Such codes can be two-dimensional or three-dimensional codes and can be in the form of, for example, what are known as QR codes, bar codes or individually defined shape and/or color combinations.

In one possible embodiment of the reference sample, the structure has substructures of a first lateral extent, for example a first diameter, a first circumference or a first edge length, in a central region and substructures of a second lateral extent, for example a second diameter, a second circumference or a second edge length, in a peripheral region.

In further embodiments of the invention, the two-dimensional substructures can be formed, for example, as parts of what is known as a Siemens star. The two-dimensional substructures designed as circular sectors are arranged in alternation with circular sectors that are not excitable to emit luminescence. The number of rays of the Siemens star is, for example, n=16 with a diameter of, for example, 20 μm. Such an embodiment enables a qualitative measurement of the resolution and a comparison of different microscopes.

In a further embodiment according to the invention, the reference sample is provided with an axial substructure so as to be able to determine a resolution of a respective microscope in the direction of its optical axis (z-direction). In an advantageous embodiment, this comprises at least one pair of lines intersecting at one point. The lines extend obliquely to the z-direction in the carrier material. The exact location of the intersection point as well as the locations and profiles, in particular the lengths, angles and thicknesses or widths of the lines in the carrier material are known.

Such an embodiment of a structure with axial substructures allows the axial resolution of the microscope to be determined. In addition, a deviation of an instantaneous alignment of the optical axis of the microscope relative to the intersection point can be determined. For this purpose, the microscope or its corresponding optical elements are focused in the z-direction. The focus is shifted in the z-direction, and the resulting emission radiation is detected. If the intersection point is located exactly on the optical axis, luminescence is captured only once when the focus is directed into the intersection point and luminescence is excited there. If the path along which the focus is shifted in the z-direction is away from the intersection point, luminescence is excited when the focus is directed into one of the lines. The relative location relationship of the reference sample and the optical axis can be deduced from the location of the origins of the respective luminescence (=current focus position), the thickness of the lines and the distance between the two origins.

In addition, such an axial substructure allows the axial resolution to be measured. For this purpose, the reference sample is shifted relative to the optical axis, in particular along an X-Y plane and thus orthogonally to the optical axis extending in the z-direction. Since the locations and profiles of the lines are known, it is possible, for example starting from the intersection point, to search for the (boundary) position at which the optical axis intersects both lines and both lines can still be distinguished from one another based on the fluorescence radiation emitted by them. The thickness of the lines must also be taken into account. Based on the distance of the boundary position found in this way from the intersection point and with the knowledge of the locations and profiles of the lines, the distance between the lines at the boundary position can be determined. This distance reflects the achievable axial resolution of the microscope in question.

In a further embodiment of the reference sample according to the invention, intersecting lines are embodied as lateral substructures. The lines are parallel to a surface of the carrier material, specifically in an X-Y plane of the reference sample. Here, too, the resolution, this time in the lateral direction, can be determined on the basis of the determined limit position. The resolution can be calculated, for example, using the known positions of the intersection point and the limit position and also the profiles of the lines. It is also possible to use a previously compiled look-up table (LUT) for the lateral or axial resolution.

In a further embodiment of the reference sample according to the invention, at least one line likewise extends obliquely in the carrier material, but the lines intersect at a point outside of at least one of the midpoints of the lines. It is likewise possible that the at least one oblique line does not intersect the at least one other line and merely approaches it. If the distances between the lines at the different positions of the structure are known, they can be used to determine the resolution, as described above.

In further embodiments, a structure comprises axial substructures in the form of areas or cuboids. Their edge lengths are 100 nm, 250 nm or 500 nm, for example. In an alternative embodiment, the structure is implemented as an area that has a size, for example, of 5×5 mm and is produced approximately 25 nm, but advantageously 10 nm, below the surface of the carrier material. The variance of the depth of the area in relation to the surface is preferably 5 nm or less.

If spheres are formed as the axial substructures, these can have diameters of 25, 50, 75, 100, 125, 150, 175, 200, 250, 300, 400, 500, 600, 700, 800, 1000 or 1400 nm, for example. The spheres can be arranged in grids (arrays). Such a grid is, for example, 10×10 μm in size.

If the spheres are arranged linearly to one another or in grids, for example in a 4×4 grid, the distances between the spheres are, for example, 25, 50, 75, 100, 125, 150, 175, 200, 250, 300, 400, 500, 600, 700, 800, 1000 and/or 1400 nm. With all embodiments of the spheres or areas or cuboids, their dimensions within an array or a line can differ in further embodiments. For example, the dimensions increase in one direction.

The embodiment of the substructures in the form of at least one sphere allows the measurement of a point spread function (PSF) of the optical imaging system. The PSF can be used to calibrate the optical imaging system. Depending on the configuration, two-dimensional and/or grid-like substructures allow not only the measurement of a lateral and/or axial resolution but also a determination of further optical effects, such as vignetting ("shading"). In this case, for example with the same illuminance, a detected intensity is determined at the periphery of the field of view in relation to the center of the field of view.

In a further possible embodiment of the reference sample, pairs of vacancies are produced two-dimensionally as structure. Within this area, which is excitable to emit luminescence radiation, there are regions in the form of, for example, circular areas, triangles, rectangles, polygons and/or other shapes on which no pairs of vacancies are produced. These non-excitable regions may be arranged in a grid. As a result, the test pattern is thus designed at least over a region of the field of view as a matrix that is excitable to emit luminescence radiation and has non-excitable regions present therein. When using a reference sample with such a test pattern, the non-excitable regions within the excitable matrix are detected and the resolution is determined.

The reference sample according to the invention can be used to calibrate a high-resolution microscope. A correspondingly designed method comprises the step of providing the reference sample in the beam path of the microscope to be calibrated, wherein at least one substructure of a selected structure of the reference sample is brought into an object field (field of view; FoV) of the microscope. Image data of the at least one substructure are acquired using the microscope and evaluated by means of an analysis unit. The evaluation results are stored in a retrievable form and are thus available for subsequent data-technological processing. The analysis unit is a computer, for example.

The reference sample can be provided in this and other methods by a user placing and positioning the reference sample. It is also possible to use artificial intelligence algorithms to select and/or correctly position the reference sample. In further configurations, the reference sample can be recognized and correctly positioned by detecting, capturing and evaluating a machine-readable code. The necessary control commands can be generated on the basis of the evaluation results, and, for example, drives of a sample stage can be controlled accordingly.

Depending on a calibration currently to be carried out, the reference sample can be recognized and checked as to which of the test patterns it contains is suitable for the current calibration. If a suitable test pattern is available, it is positioned in such a way that the calibration can then be carried out. The individual calibrations can be carried out automatically one after the other. During or after a calibration, a user can be given information relating to the current status and the result of the respective calibration in order to allow success monitoring and to make possible any necessary intervention by the user. At the end of the calibration, the user can be shown a report on the calibration process with a success rating and further parameters.

The same applies if a further calibration is then to be carried out, for example in order to calibrate other components of the optical system, in particular of the microscope.

The reference sample can additionally be used in a method for referencing at least two microscopes to one another. Such a method comprises the step of providing the reference sample in the beam path of a first microscope, wherein at least one substructure of a selected structure of the reference sample is brought into an object field (field of view; FoV) of the first microscope. Image data of at least one substructure are acquired and evaluated by means of the first microscope, and the first evaluation results are stored in a retrievable form. Optionally, the setting or operating parameters of the first microscope can also be stored. In order to be able to compare two or more microscopes with one another, it is advantageous if the recording conditions for the images are comparable as much as possible. For example, settings for the illumination power, the pixel resolution and parameters of the objective used can be stored in order to set them with corresponding operating parameters of the second microscope or at least to approximate them.

The reference sample is provided in the beam path of a second microscope, wherein again at least one, preferably the same, substructure of the selected structure of the reference sample is brought into an object field (field of view; FoV) of the second microscope. Using the second microscope, image data of at least one substructure are acquired and evaluated, and the evaluation results are provided as second evaluation results. The first and second evaluation results are compared with each other.

The reference sample can be recognized and evaluated according to a previously defined routine, which is stored, for example, in a control unit and is retrieved when required. Alternatively, a method using artificial intelligence and/or neural networks can be carried out in order, for example, to adapt captured parameters to recorded image contents and to optimize image capturing.

In a further configuration of the method, the first and/or the second evaluation results are compared with expected values by means of a comparison unit.

Additionally or alternatively, the microscope in question can be classified on the basis of the evaluation results or the comparison results. For this purpose, said microscope can be assigned to previously defined groups, for example.

Based on the measured values determined, it is possible to derive technical parameters of the optical system and use them, for example, to control motorized components.

Furthermore, it is possible to adapt signal curves based on the determined parameters of involved components and detected specific optical effects in order to improve the quality of the acquired image data.

In addition to an automated calibration and adjustment, the results of the capturing of the reference sample and its evaluation can be used to automatically capture specific sample regions.

In addition, it is possible to create calibration curves, for example of an illumination power, and to store them in a look-up table or a function, for example.

An advantage of the invention is in particular the use of a non-bleaching sample. This makes it possible to make direct comparisons between systems without causing degradation effects or uncertainties owing to different luminescence responses at the same illuminance, e.g., due to bleaching. Therefore, no waiting times need to be observed for the sample to recover after it has been used. The repeatability of measurements and comparisons is significantly improved. In addition, very good long-term exposures and comparisons of the long-term stability of the systems are possible. Test patterns according to the invention are producible with sizes in the lateral direction of 20 nm to 2 µm with high reproducibility and small deviations. In addition, the absorption spectra of the reference samples according to the invention in the different embodiments and their broad emission spectra make possible the use in many different optical systems.

BRIEF DESCRIPTION OF THE DRAWINGS

The invention is explained below on the basis of exemplary embodiments and figures, in which:

FIG. 3d with increasing distances, and FIG. 3e as a grid;

FIG. 5 shows a schematic illustration of an exemplary embodiment of a reference sample with a test pattern in the form of a grid of regularly arranged areas as substructures;

FIG. 6 shows a schematic illustration of an exemplary embodiment of a reference sample with a test pattern in the form of an inner grid of regularly arranged areas as first substructures and an outer grid with second substructures;

FIG. 7 shows a schematic illustration of an exemplary embodiment of a reference sample having a test pattern in the form of a grid of areas that are not excitable to emission in a matrix that is excitable to emission;

FIG. 8 shows a schematic illustration of a first exemplary embodiment of an axial substructure in the form of two lines intersecting in the z-direction and a procedure for determining the axial resolution;

FIGS. 9a and 9b show a schematic illustration of a second exemplary embodiment of an axial substructure in the form of two lines approaching one another, in a perspective view (FIG. 9a) and in a plan view (FIG. 9b);

FIGS. 10a and 10b show a schematic illustration of a third exemplary embodiment of an axial substructure in the form of an arrangement of spherical axial substructures in a perspective view (FIG. 10a) and in a plan view (FIG. 10b);

DETAILED DESCRIPTION OF THE DRAWINGS

Figure 1:
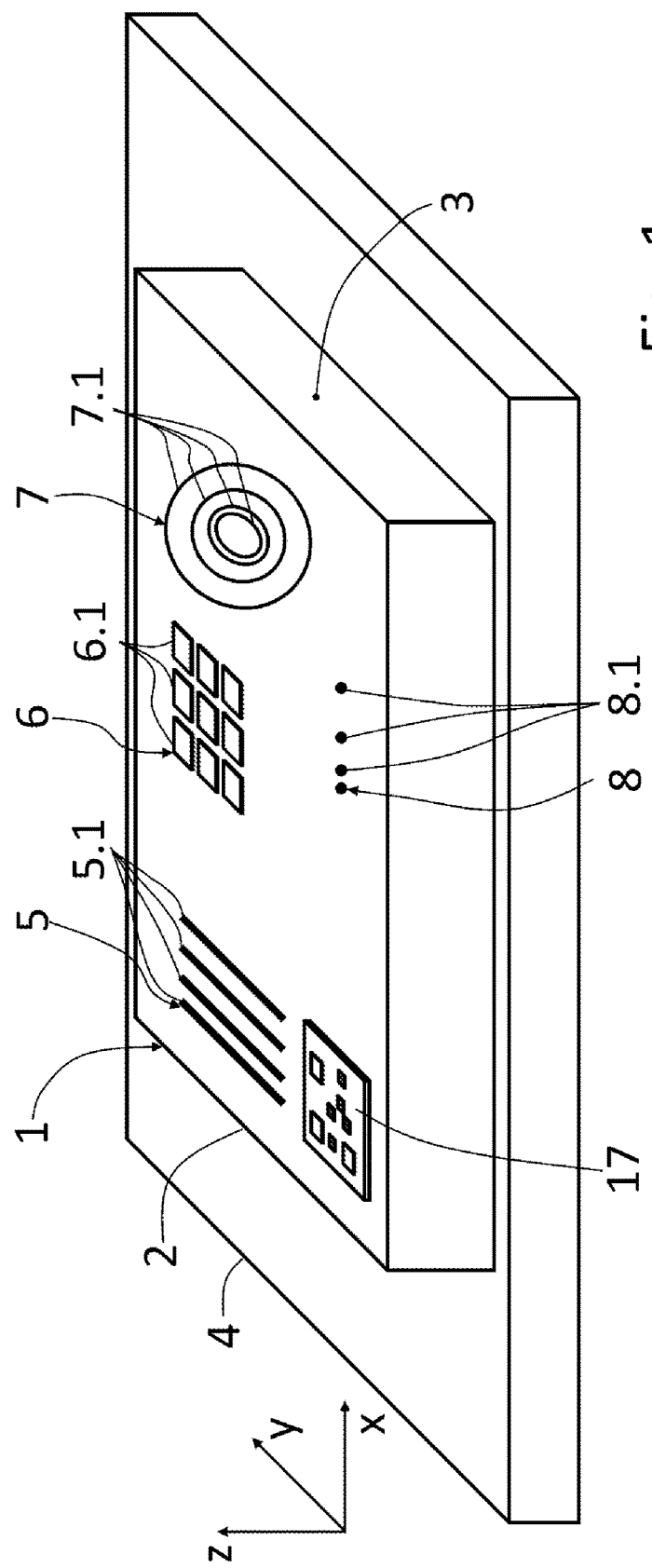
FIG. 1 shows a schematic illustration of an exemplary embodiment of a reference sample according to the invention having five different structures, each made up of a number of substructures.

The reference sample 1 shown schematically in FIG. 1 has a carrier structure 2 made of NV diamond as the carrier material 3. A first to fourth structure 5, 6, 7 and 8 (=test patterns 5, 6, 7 and 8, respectively) are applied to a side surface of the carrier structure 2, which consists of substructures 5.1 in the form of lines arranged in a row, substructures 6.1 in the form of square areas, substructures 7.1 in the form of concentric rings, and substructures 8.1 in the form of point-shaped areas. A substructure is additionally present, which is in the form of a machine-readable code 17 in the form of a QR code. The side surface with the structures 5, 6, 7 and 8 extends in a plane which is parallel to an X-Y plane of a Cartesian coordinate system.

Figure 3A:
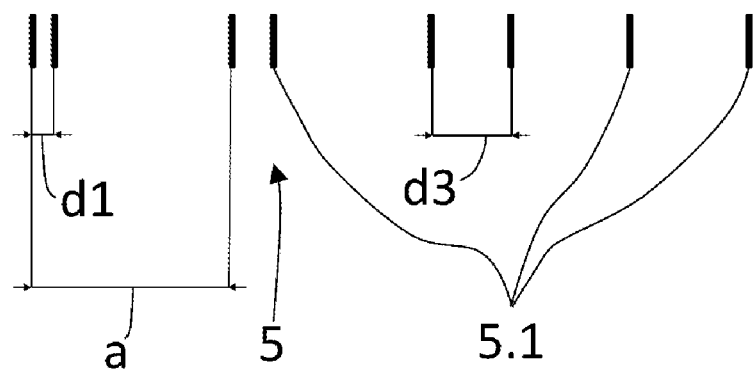
FIGS. 3a to 3e show schematic illustrations of five test patterns with increasing distances between the substructures; shown are line pairs arranged in a row, in FIG. 3a as perpendicular or vertical line pairs, in FIG. 3b as inclined line pairs, and in FIG. 3c as horizontal line pairs.
Figure 3B:
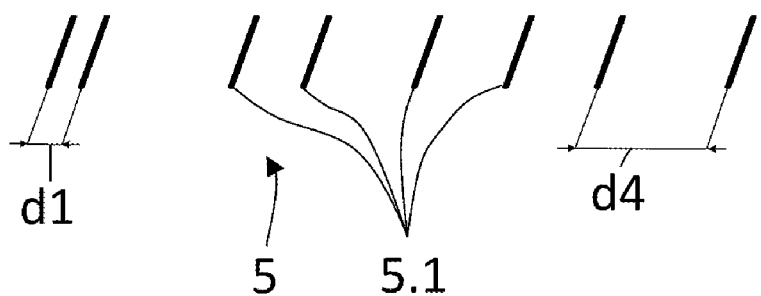
Figure 3C:
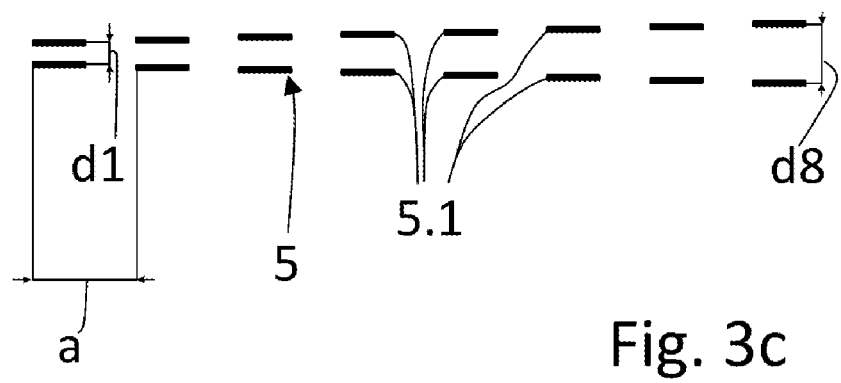

The substructures 5.1 of the first structure 5 are line pairs, whose respective distance di (i=1, 2, . . . , n) between one another varies (see FIGS. 3a to 3c). The same applies to the fourth substructures 8.1. Likewise, the radii of the substructures 7.1 of the third test pattern 7 increase from the inside to the outside with increasing increments.

Figure 2:
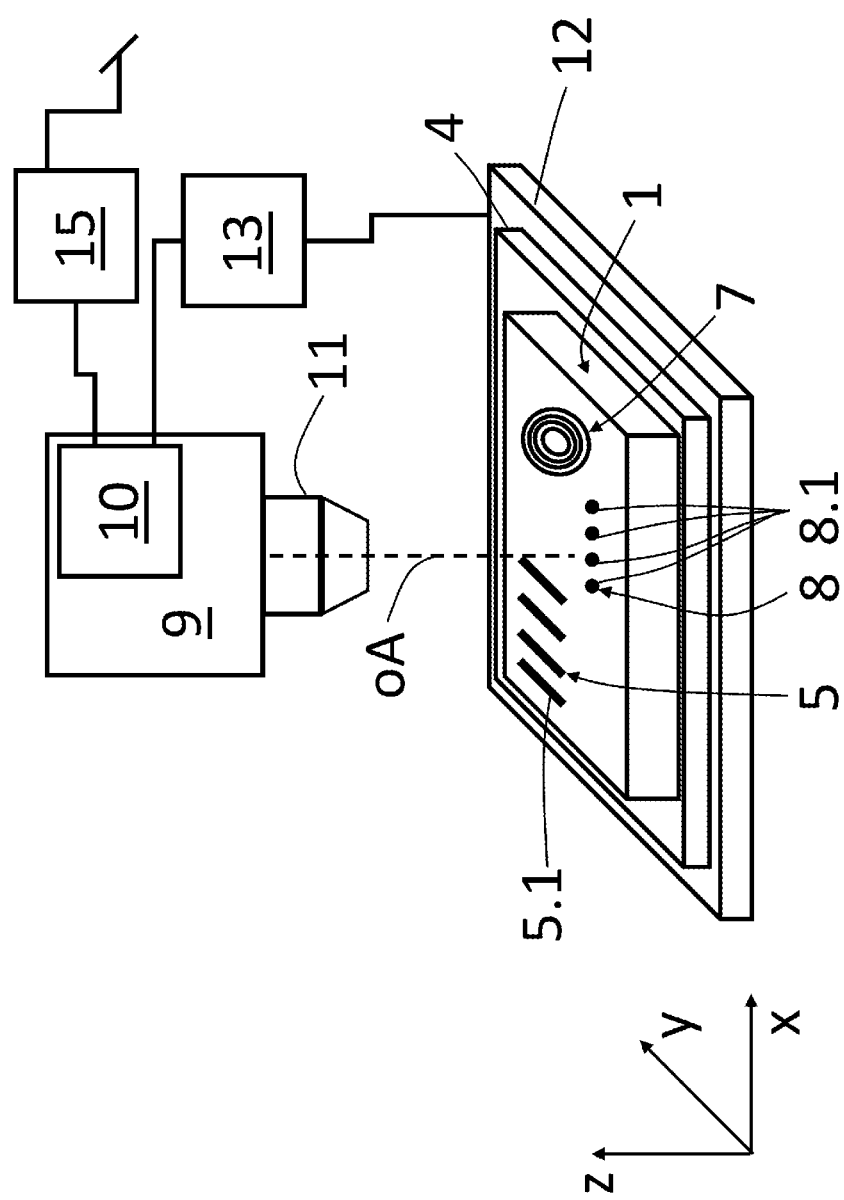
FIG. 2 shows a schematic illustration of an exemplary embodiment of a microscope with a further exemplary embodiment of a reference sample according to the invention.

FIG. 2 shows the use of a reference sample 1 according to the invention for calibrating and/or adjusting an in particular high-resolution microscope 9. The microscope 9 has an evaluation and control unit 10, by means of which an evaluation of acquired image data and the generation and transmission of control commands is possible. The evaluation and control unit 10 is accordingly configured therefor. The acquisition of image data, and optionally also an illumination of the reference sample 1, takes place by means of an objective 11, whose optical axis oA is directed in the z-direction toward the reference sample 1 and the structures 5, 7 and 8. This exemplary embodiment of the reference sample 1 has no second structure 6. A further or second microscope 9 (not shown) can have the same elements as shown in FIG. 2.

The reference sample 1 is arranged on a sample stage 12. The latter is optionally movable in a controlled manner in the direction of at least one axis x, y and z by means of the drives 13. The movement of the sample stage 12 can be controlled by control commands from the evaluation and control unit 10. A comparison unit 15 that is likewise present is in the form of, for example, a computer and is configured to compare evaluation results of the evaluation and control unit 10 with one another and to make comparison results available. The comparison unit 15 can additionally be embodied to receive evaluation results from another optical system, for example another microscope, and to compare them with evaluation results from the first microscope 9 (symbolized by the dead-end connection).

For the purpose of the calibration, at least one of the structures 5, 7 and 8 is illuminated with a suitable excitation radiation, and the emission of light, for example fluorescence radiation, is excited. The emitted light is captured with the microscope 9, and the image data of the relevant structure 5, 7 and/or 8 are analyzed in the evaluation and control unit 10 configured for this purpose. If the corresponding captured structures 5, 7 and 8, whose dimensions are known, can be resolved with a permissible extent of certainty or to a predetermined degree, the microscope 9 is correctly calibrated.

If, on the other hand, the captured structures 5, 7 and 8 cannot be sufficiently resolved, control commands can be generated, which cause the sample stage 12 to move, technical parameters of the microscope 9 to be changed and/or a computational evaluation of the image data to be adapted. These measures are taken in order to calibrate the microscope 9.

Alternatively or additionally, an adjustment can also be made by bringing the optical axis oA of the objective 11 into a predetermined position relative to at least one of the substructures 5.1, 7.1 (not all labeled for reasons of clarity) and/or 8.1. The point-shaped substructures 8.1 of the test pattern 8 are suitable in particular for an adjustment.

FIGS. 3a to 3c show three modifications of the first test pattern 5, which are each formed as a number of pairs of line sections (line pairs) as substructures 5.1. The term line sections was chosen because of the short lengths of the individual substructures 5.1, which are approximately 10 μm. In all three embodiments (FIGS. 3a to 3c), a distance di (i=1, 2, . . . , n) between the line sections of a line pair increases from left to right (only a few are designated by way of example). In FIG. 3a, the distance d1 between the line sections of the first line pair is less than the distance d3 of the third line pair. The substructures 5.1 shown in FIG. 3a are line pairs which are parallel to one another and are arranged vertically from left to right with respect to a row direction. While the distances d1 to d4 change step by step in the row direction, the respective first line sections of a line pair are spaced apart from one another with a constant pitch a of, for example, 10 μm (only shown for the first and second line pairs). The same applies to the embodiments of the substructures 5.1 shown in FIGS. 3b and 3c. The line pairs shown in FIG. 3b are likewise parallel to each other, but inclined with respect to a vertical direction. In FIG. 3c, line pairs are arranged horizontally in a row.

Figure 3D:
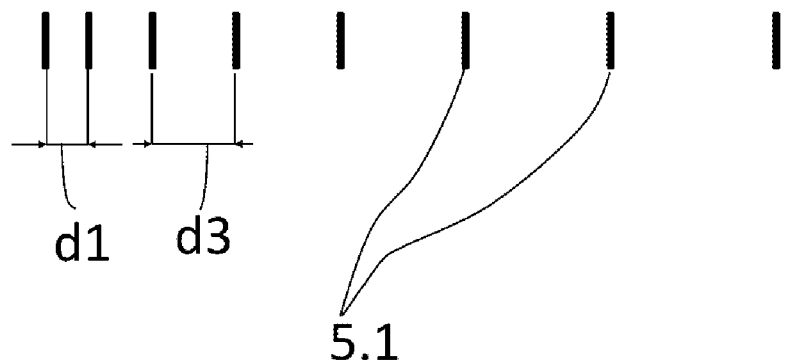

A possible embodiment with increasing distances between adjacent line sections is shown in FIG. 3d. Such a further design of the test pattern 5 can be used, for example, to determine the MTF.

Figure 3E:
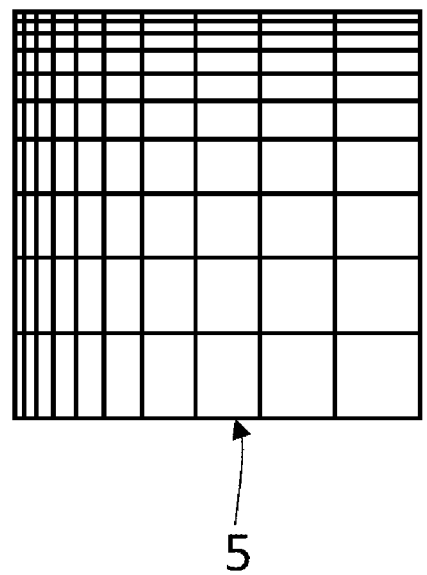

A two-dimensional modification of a test pattern 5 with changing distances is implemented in FIG. 3e in the form of a grid.

Figure 4:
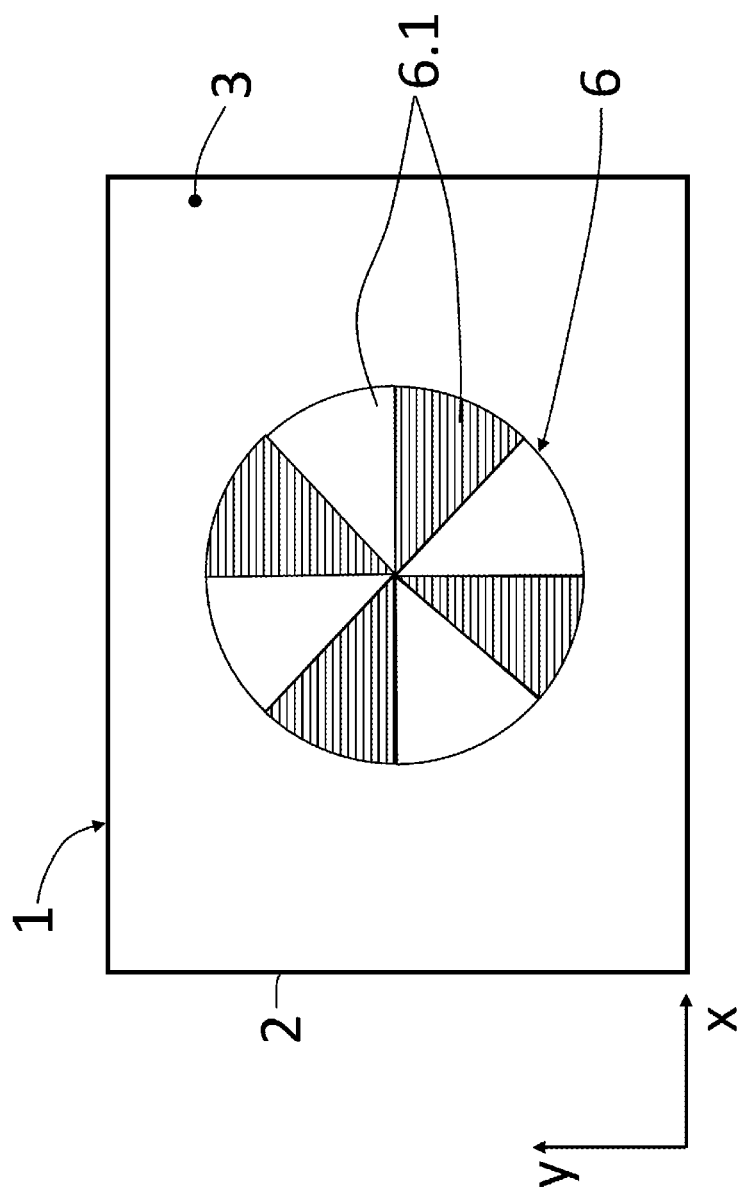
FIG. 4 shows a schematic illustration of an exemplary embodiment of a reference sample with a test pattern in the form of a Siemens star.

A further exemplary embodiment of a test pattern 6 according to the invention is what is known as a Siemens star (FIG. 4). The latter is composed of a number of wedge-shaped circular sectors which are, in alternation, excitable (shown hatched) and not excitable (not hatched) to emit luminescence light. In the exemplary embodiment shown, there are a total of eight wedge areas. In further exemplary embodiments, sixteen wedge surfaces are formed (not shown for a better overview), for example. The outer diameter of the Siemens star is 20 μm, for example. A test pattern 6 in the form of a Siemens star allows the determination of the resolution in a known manner by searching for the maximum achievable resolution, on the detection side, of the circular sectors tapering toward the center of the test pattern 6. In addition, the test pattern 6 in the form of the Siemens star can be used to calibrate a microscope 9 and/or to compare at least two microscopes 9 (see, for example, FIGS. 11 and 12).

As already described in relation to FIG. 1, the test pattern 6 can be a grid of substructures 6.1 of the same type. In the exemplary embodiment according to FIG. 5, the substructures 6.1 are squares, which are arranged in a regular grid with a constant pitch a. The test pattern 6 shown permits checking for the occurrence of distortions in the image. Thus, the correct, undistorted images of the outlines of the substructures 6.1 can serve as evidence of a distortion-free image. In addition, the brightness on the optical axis and in the field can be determined and any vignetting can be detected and captured.

In further embodiments of the test pattern 6, the substructures 6.1 can be in the form of points or circles (not shown).

In a reference sample 1, substructures 6.1 of different sizes and/or different shapes can also be present within a test pattern 6 (FIG. 6). A number of substructures 6.1 can be arranged here in an inner grid, for example in the form of squares having a first edge length. The substructures 6.1 of the inner grid have a constant first pitch a1 along the rows and columns of the grid. The inner grid is surrounded by an outer grid, which is formed by substructures 6.1 that have a second edge length and are spaced apart from one another by a second pitch a2. The second edge length and the second pitch a2 are greater than the first edge length and the first pitch a1 of the substructures 6.1 of the inner grid.

In a further embodiment of a reference sample 1 according to the invention, the substructures 6.1 can be formed as areas that are not excitable to emit luminescence radiation, for example as circular areas, which are embedded in an area (matrix 16) that is excitable to emit luminescence radiation (FIG. 7).

In addition to determining the resolution in the lateral direction with the aid of lateral substructures 5.1, 6.1, 7.1, 8.1 (see FIGS. 1 to 3), a reference sample 1 according to the invention can additionally or alternatively have at least one axial substructure 5.1ax. In an exemplary embodiment (FIG. 8), the axial test pattern 5ax is formed from two lines which intersect in the direction of the z-axis (z-direction) at an intersection point S and are formed so as to extend obliquely in the carrier material 3.

If the microscope 9 (see FIG. 2) is arranged relative to the reference sample 1 in such a way that its optical axis oA is directed into the intersection point S of the substructures 5.1ax (scenario I), luminescence light is produced only at this intersection point S and an image I is obtained from a z-position which corresponds to the position of the intersection point S in the z-direction (symbolized with an oval B I). The intersection point S is found here by shifting the focus of the microscope 9 or the objective 11 in the z-direction. The z-position of the image BI1 can be compared with an expected z-position of the intersection point S and be used to calibrate the microscope or to adjust it.

If, on the other hand, the reference sample 1 and the optical axis oA are in a laterally shifted relative position (scenario II), luminescence is produced when the focus is incident on the substructure 5.1ax that extends closer to the surface of the carrier structure 2. This luminescence is shown captured as the first image $B_{II1}$ and stored together with the associated z-position. If the focus is then shifted further along the optical axis oA, no luminescence light is captured along a path distance that corresponds to an intermediate space of the substructures 5.1ax along the course of the optical axis oA. If the focus position coincides with the z-position of the substructure 5.1ax located deeper in the carrier structure 2, luminescence light is produced again. A second image $B_{II2}$ is captured and stored with the associated z-position. The current relative location of the reference sample 1 and optical axis oA can be inferred based on the stored z-positions of the images $B_{II1}$ and $B_{II2}$ and based on the fact that a first image $B_{II1}$ was already captured after the focus has traveled a shift distance that is less than the shift distance required to reach the expected z-position of the intersection point.

These axial substructures 5.1ax are used to determine the axial resolution of the microscope 9. The ability to resolve the resulting gap between the structures is a measure of the system's ability to axially distinguish between sizes of structures.

In a modification of the invention, the axial substructures 5.1ax of the test pattern 5ax are likewise implemented as two lines extending obliquely in the carrier material 3 (FIG. 9a), but they do not intersect. The substructures 5.1ax extend three-dimensionally, i.e., in two mutually tilted planes, in the carrier material 3. FIG. 9b, which shows a plan view of the carrier structure 2 in the z-direction, shows that the substructures 5.1ax approach one another but do not intersect.

In principle, the procedure described for FIG. 8 can be used for the purpose of adjustment and/or calibration. Instead of finding an intersection point S, the distance between the substructures 5.1ax can be used as a measure of the resolution or the adjustment.

Axial substructures 14.1 of a further axial test pattern 14 can also be spheres having different diameters, as is shown schematically in FIG. 10b. The substructures 14.1 can be formed in a common z-position (FIG. 10a). In further embodiments of the test pattern 14, the spheres can also be arranged at different depths, i.e., at different z-positions.

Figure 11:
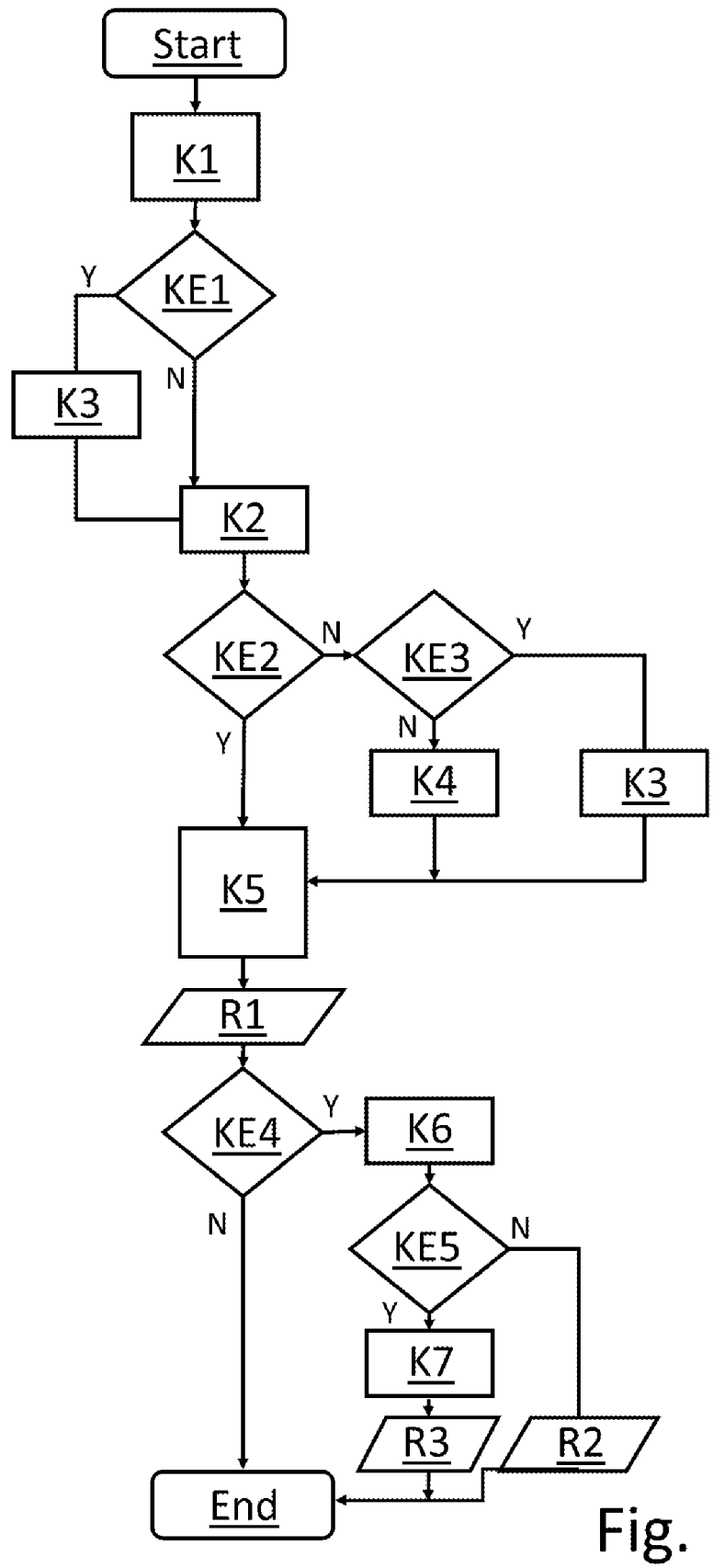
FIG. 11 shows a flowchart of a version of a method for calibrating a microscope by means of a reference sample according to the invention.

A version of a method according to the invention for calibrating a high-resolution or super-resolution optical device, in particular a microscope 9, will be explained with reference to FIG. 11. The subsequent steps can each comprise a plurality of individual measures, which are combined functionally and graphically into blocks for the purpose of better clarity in FIG. 11 (then correspondingly also in FIG. 12).

At the beginning, a reference sample 1 according to the invention is placed into the optical system to be calibrated. The placement can be done by a user or automatically. It is also possible to use artificial intelligence algorithms to select and/or correctly position the reference sample 1. A program set up to carry out the measurement task or the calibration is started and, if necessary, the measurement task is specified (step K1). In a first decision (KE1) to be made, the need to carry out a reference run is determined. If the answer is negative (N), the parameters for an image recording are automatically selected and/or determined. A first image is then captured and stored (step K2).

If the first decision (KE1) is affirmative (Y), a referencing run is carried out in step K3 and/or a current position of the sample stage 12 is determined before continuing with step K2.

The subject of the subsequent second decision step KE2 is the question of whether the reference sample 1 to be imaged is visible in the captured image. If this is not the case (N), a decision is made in the third decision step KE3 whether a manual search is carried out in a step K3 or whether an automated search is carried out in a step K4. In both alternatives of the search, reference marks can be used, which are provided in step K3 by a user or in step K4 by the optical system.

If the reference sample 1 is contained in the captured image, the procedure can continue directly with step K5. In this step, existing reference marks are homed in on in order to bring about the desired starting location of the sample stage 12, microscope 9 and reference sample 1. The structure 5, 6, 7 or 8 to be measured is homed in on, and an image thereof is recorded. The acquired image data are evaluated with regard to, for example, the image content, the determination of distances di, the brightness, the homogeneity, etc. Additionally or alternatively, captured structures 5, 6, 7 or 8 can be used as reference marks.

The results obtained in this way are output or stored in a retrievable manner and made available (step R1).

If the results from step R1 are not (N) to be compared with theoretical values (fourth decision step KE4), the method can end. If, on the other hand, such a comparison is to be carried out (Y), step K6 is carried out. The comparison results can optionally be used to classify the system (KE5). If no classification is to take place (N), the comparison results are output or stored in a retrievable manner (R2) and the method ends.

Alternatively (Y), in step K7, the system is classified based on the degree of agreement with the theoretical value or on whether the theoretical value has been reached.

The comparison results and the classification produced are output or stored in a retrievable manner (R3) and the method is ended. The method steps can be repeated for a second microscope 9.

Figure 12:
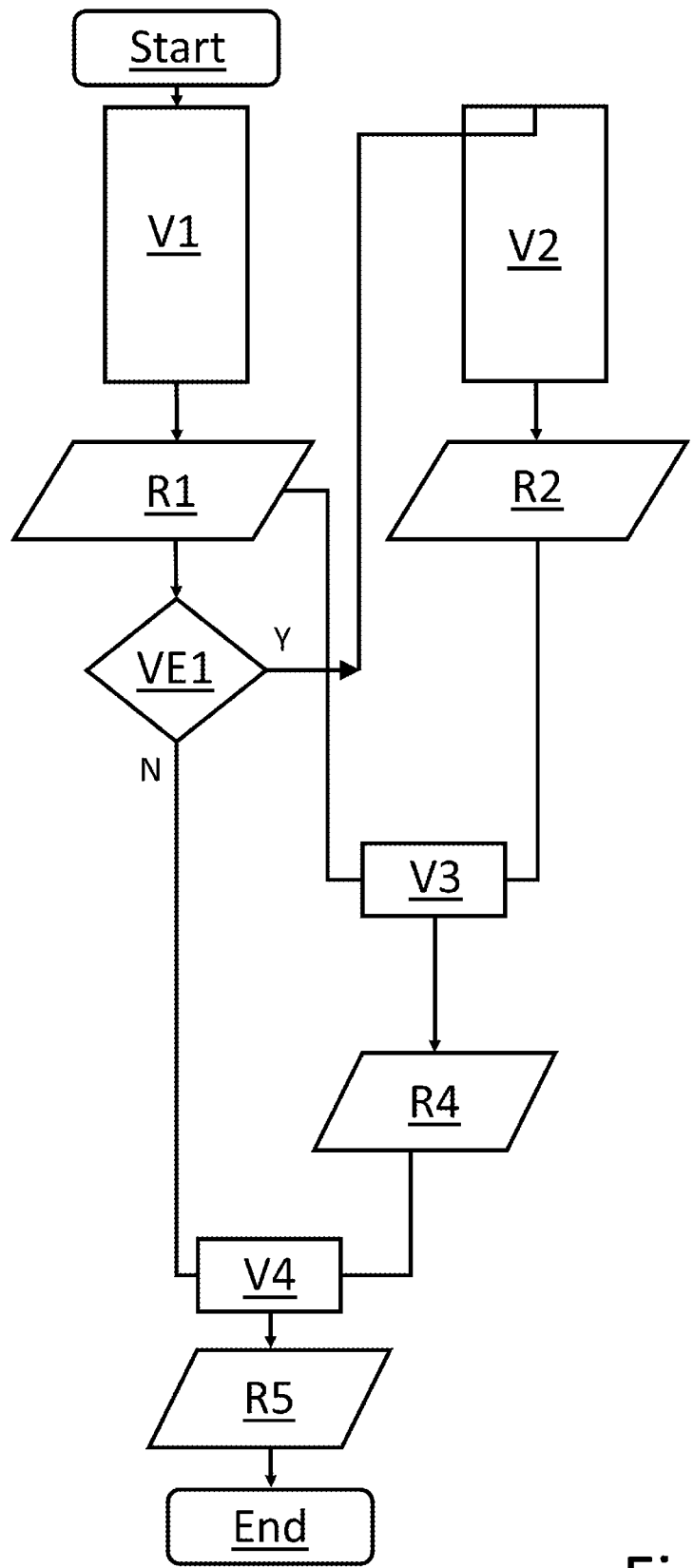
FIG. 12 shows a flowchart of a version of a method for comparing a first microscope with a second microscope using a reference sample according to the invention.

A version of a method for comparing two optical systems, in particular two microscopes 9, is described with reference to FIG. 12. The reference sample 1 is placed in a first microscope 9, the relevant sample points, in particular the desired test pattern 5, 6, 7 or 8, are sought, and the image recording is prepared. To do this, the necessary parameters of the image recording must be known or stored (step V1). Such parameters are, for example, the temporal resolution, the pixel resolution, the light intensity, the detector gain, illumination times, scanning speed, and spectral division. Image capture and an evaluation of the acquired image data are also subsumed under step V1. The image capture can comprise all spatial dimensions (2D, 3D) as well as a time profile. The evaluation is aimed, for example, at a feature that is classified as relevant. Such a feature is, for example, a captured intensity profile of the test pattern 5, 6, 7 or 8, of which at least one distance between the maxima of the intensities is evaluated.

The evaluation can additionally or alternatively be based on the size of the regions of the substructures 5.1 to 8.1, 14.1 excited to emit luminescence light (e.g., use of the full width at half maximum); on a size of a gap between excited regions (e.g., via the Rayleigh, Dawes, Sparrow criterion); uniformity/homogeneity of excited regions; a temporal constancy or variation of the excited regions. The evaluation can be based on criteria such as the Nyquist-Shannon theorem, the signal-to-noise ratio; contrast; a required resolution. The reference sample 1 is removed from the first microscope 9.

The determined parameters are output and stored (R1). In a first decision step VE1 of the method, the question must be answered as to whether the evaluation results of the first microscope 9 should be compared with those of a second microscope 9. If the answer is negative (N), a comparison is made with theoretical values in step V4. This can be, for example, the theoretically achievable resolution according to the Abbe criterion. The result of the comparison is output or the first microscope 9 is classified (R5) and the method is ended.

If, on the other hand, the comparison with a second microscope 9 is affirmed (Y) in decision step VE1, the reference sample 1 is placed into the second microscope 9 and the measures corresponding to V1 are carried out in step V2. The results are output and stored (R2).

The system parameters of the first microscope 9 are applied to the second microscope 9 as far as possible. For example, a temporal resolution, a pixel resolution, the light intensity, a detector gain, exposure times, scanning speed and/or spectral division can be adopted. If necessary, the parameters used for the image capturing are adapted to the requirements of the second microscope 9. For example, an adaptation can be required when comparing a laser scan microscope with a wide-field microscope or a high-resolution SR microscope with a laser scan microscope or wide-field microscope.

The results of the first microscope 9 from R1 are then compared with the results of the second microscope 9 from R2 in a step V3. The results from V3 are output (R4) as comparison values between the two microscopes 9. In the subsequent step V4, the comparison with theoretical values takes place and the results are output in R5 and the method is ended.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE SIGNS

1 Reference sample
2 Carrier structure
3 Carrier material
4 Object slide
5 First structure/first test pattern
5.1 Substructure (of the first structure 5)
5$ax$ Axial test pattern
5.1$ax$ Axial substructure
6 Second structure/second test pattern
6.1 Substructure (of the second structure 6)
7 Third structure/third test pattern
7.1 Substructure (of the third structure 7)
8 Fourth structure
8.1 Substructure (of the fourth structure 8)
9 Microscope
10 Evaluation and control unit
11 Objective
12 Sample stage
13 Drives
14 Fifth structure/fifth test pattern
15 Comparison unit
16 Matrix
17 Machine-readable code
o$A$ Optical axis
B$I$ Image from scenario I
B$_{II1}$ First image from scenario II
B$_{II2}$ Second image from scenario II Ki, Vi Method steps; with i=1 to 7
KEi, VEi Decision steps, with i=1 to 5
Ri Result steps, with i=1 to 3
S Intersection point

What is claimed is:

1. A reference sample for calibrating and/or adjusting a microscope, comprising:
   at least one carrier structure made of a carrier material which, at least in regions of its extent, is excitable to emit luminescence light,
   wherein the carrier material has at least one two-dimensional and/or three-dimensional structure which is predetermined in terms of its dimensions and shape and consists of a number of substructures,
   the carrier material is diamond or silicon carbide;
   the carrier material is doped in or around the regions of the two-dimensional and/or three-dimensional structure in order to be excitable to emit the luminescence light; and
   the respective substructure is formed laterally and/or axially as an area, as points, as a three-dimensional structure or as a combination of at least two line sections, wherein a lateral substructure extends on or under a surface of the reference sample and substantially parallel thereto, while an axial substructure extends in or obliquely to a z-direction into the carrier material.

2. The reference sample as claimed in claim 1, wherein the carrier material has regions in which it is doped with nitrogen-vacancy, silicon-vacancy, phosphorus-vacancy, oxygen-vacancy, sulfur-vacancy, tin-vacancy and/or manganese-vacancy pairs.

3. The reference sample claimed in claim 1, wherein the lateral substructures of a structure are pairs of line sections with a respective distance between the line sections, wherein the distance between the line sections changes step by step from pair to pair.

4. The reference sample as claimed in claim 3, wherein the distances are selected from a range from 25 nm to 500 nm.

5. The reference sample as claimed in claim 1, wherein the axial substructures comprise at least one pair of intersecting lines.

6. The reference sample as claimed in claim 1, wherein the lateral substructures of a respective structure are formed as areas which are excitable to emit luminescence.

7. The reference sample as claimed in claim 6, wherein a thickness of the substructures in the z-direction is less than or equal to 50 nm, preferably less than or equal to 25 nm.

8. The reference sample as claimed in claim 6, wherein the two-dimensional substructures are arranged in alternation with areas which are not excitable to emit luminescence.

9. The reference sample as claimed in claim 1, wherein the substructures are formed as areas which are not excitable to emit luminescence and are embedded in a matrix which is excitable to emit luminescence.

10. The reference sample as claimed in claim 1, wherein a structure is formed as a machine-readable code.

11. The use of a reference sample as claimed in claim 1 for calibrating a microscope, comprising the steps of:
    providing the reference sample in the beam path of the microscope to be calibrated, wherein at least one substructure of a selected structure of the reference sample is brought into an object field of the microscope;
    acquiring image data of the at least one substructure by means of the microscope;
    evaluating the acquired image data; and
    storing the evaluation results in a retrievable form.

12. A method for referencing at least two microscopes to one another, comprising the steps of:
    providing the reference sample as claimed in claim 1 in the beam path of a first microscope, wherein at least one substructure of a selected structure of the reference sample is brought into an object field of the first microscope;
    acquiring image data of at least one substructure by means of the first microscope;
    evaluating the acquired image data and storing the evaluation results as first evaluation results;
    providing the reference sample in the beam path of a second microscope, wherein at least one substructure of the selected structure of the reference sample is brought into an object field of the second microscope;
    acquiring image data of at least one substructure by means of the second microscope;
    evaluating the acquired image data and providing the evaluation results as second evaluation results; and
    comparing the first and second evaluation results with each other.

13. The method as claimed in claim 12, wherein the first and/or the second evaluation results are compared with expected values by means of a comparison unit.

* * * * *